JOHN D. PHYFE & JOHN D. PERRINE.
Improvement in Shutter-Fasteners.
No. 114,037. Patented April 25, 1871.
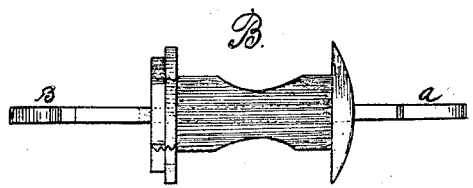
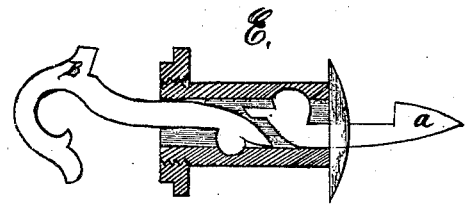
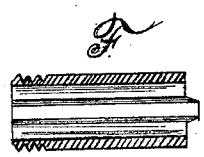
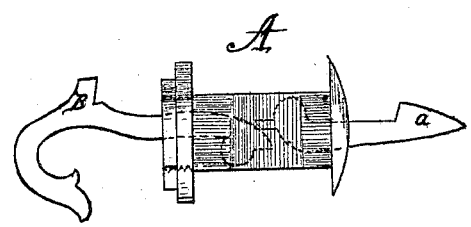
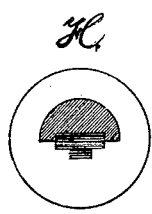
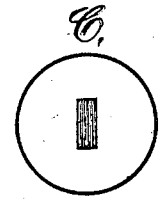
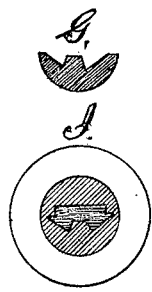
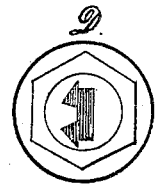
Witnesses:
D. Smith
Chas. E. Upperman
Inventors.
John D. Phyfe
John D. Perrine
By Jas. B. Weimer
Attorney

United States Patent Office.

JOHN D. PHYFE AND JOHN D. PERRINE, OF NEW YORK, N. Y.

Letters Patent No. 114,037, dated April 25, 1871.

IMPROVEMENT IN SHUTTER-FASTENERS.

The Schedule referred to in these Letters Patent and making part of the same.

We, JOHN D. PHYFE and JOHN D. PERRINE, of New York city and State of New York, have invented certain Improvements in a Window-Blind and Shutter-Fastener, of which the following is a specification.

Nature and Objects of the Invention.

Our invention consists in combining and arranging the semi-cylindrical parts of the case with recesses in such a manner as to require no rivets for the hooks, as hereinafter claimed.

Figure A represents the external view, showing the hooks A and B in vertical position, and the extension into cylinder, shown by dotted lines.

Figure B represents the external view, showing the hooks in horizontal position and the shape of cylinder.

Figure C shows the view of the end of cylinder on the side of hook A and cut opening for the same.

Figure D shows the end of the cylinder on the side of hook B.

Figure E shows the section of the cylinder when taken apart, and the situation of hooks A and B inside of the vertical line.

Figure F shows the other half of cylinder, taken apart.

Figures G and H show the view of the halves of the cylinder on the end of hook B when opened.

Figure I shows the halves of the cylinder when put together without the nut or end D.

Hooks A and B are perfectly independent of each other, which is shown by Fig. E.

Hook B is the inside or window-sill hook.

Hook A, outside or wall-hook.

Both of these hooks are guided and fastened by a circular cut inside of channel of cylinder corresponding to shape, and enabling them to have free movements without losing their proper places.

When the blind is closed and hook B has been fastened to the window-sill the outside hook A cannot operate on the inside hook B by lifting the same, therefore the blind or shutter can only be opened from the inside. Contrary hook B will lift hook A when opened and fastened to the wall.

Claim.

What we claim as our invention is—

As an article of manufacture, the shutter-fastener composed of the longitudinal sectional parts, one carrying the face-plate, as shown, and the two secured by a screw-nut, the two hooks having projections working in recesses in the sides of the sectional case, and hence not requiring rivets, all as and for the purpose set forth.

JOHN D. PHYFE.
JOHN D. PERRINE.

Witnesses:
WILLIAM BETTS,
TREADWELL SEAMAN.